(12) United States Patent
Enriquez

(10) Patent No.: US 7,651,121 B2
(45) Date of Patent: Jan. 26, 2010

(54) MOLDING FOR VEHICLE HEADLINER

(75) Inventor: Miguel A. Enriquez, Toluca (MX)

(73) Assignee: GM Global Technology Operations, Inc., Detroit, MI (US)

( * ) Notice: Subject to any disclaimer, the term of this patent is extended or adjusted under 35 U.S.C. 154(b) by 549 days.

(21) Appl. No.: 11/534,786

(22) Filed: Sep. 25, 2006

(65) Prior Publication Data

US 2008/0073888 A1 Mar. 27, 2008

(51) Int. Cl.
*B60R 21/20* (2006.01)
(52) U.S. Cl. .................................. 280/728.3; 280/730.2
(58) Field of Classification Search .............. 280/730.2, 280/728.3
See application file for complete search history.

(56) References Cited

FOREIGN PATENT DOCUMENTS

JP 2002293212 A 10/2002

*Primary Examiner*—Faye M. Fleming

(57) ABSTRACT

A molding assembly closes a gap between the track of a vehicle sliding door and a headliner that conceals a roof rail mounted air bag. The headliner has an edge that extends along the track but is spaced from the track to create a gap. The molding assembly includes a carrier and a flexible seal strip. The carrier carries a plurality of fastening clips that engage with apertures in the roof rail to attach the carrier to the roof rail. The flexible sealing strip has a stem that mounts on a leg wall of the carrier, a first arm that laps onto the edge of the headliner panel and a second arm that laps onto the track. The headliner bends downwardly when the air bag deploys and the first arm of the flexible seal strip flexes to permit the edge of the headliner to escape from the flexible seal.

15 Claims, 4 Drawing Sheets

MOLDING FOR VEHICLE HEADLINER

FIELD OF THE INVENTION

The present invention relates to a molding for concealing a gap between the sliding door track in a vehicle and the headliner panel, and more particularly a molding that allows the headliner to fold away from the molding upon deployment of a roof rail air bag.

BACKGROUND OF THE INVENTION

It is known in motor vehicles to provide an air bag mounted upon the roof rail in order to deploy an air bag in the region between the vehicle door and the occupant. The air bag is concealed behind the headliner panel, which must fold away from the roof rail in order to permit deployment of the air bag. The provision of such a roof rail air bag and headliner arrangement in a vehicle having a sliding door presents a special challenge with respect to configuring a decorative molding to trim the region between the headliner and the sliding door track, and yet enable folding of the headliner panel to accommodate air bag deployment.

SUMMARY OF THE INVENTION

A molding assembly closes a gap between the track of a vehicle sliding door and a headliner that conceals a roof rail mounted air bag. The headliner has an edge that extends along the track but is spaced from the track to create a gap. The molding assembly includes a carrier and a flexible seal strip. The carrier carries a plurality of fastening clips that engage with apertures in the roof rail to attach the carrier to the roof rail. The flexible sealing strip has a stem that mounts on a leg wall of the carrier, a first arm that laps onto the edge of the headliner panel and a second arm that laps onto the track. The headliner bends downwardly when the air bag deploys and the first arm of the flexible seal strip flexes to permit the edge of the headliner to escape from the flexible seal.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, its application, or uses.

Figure 3:
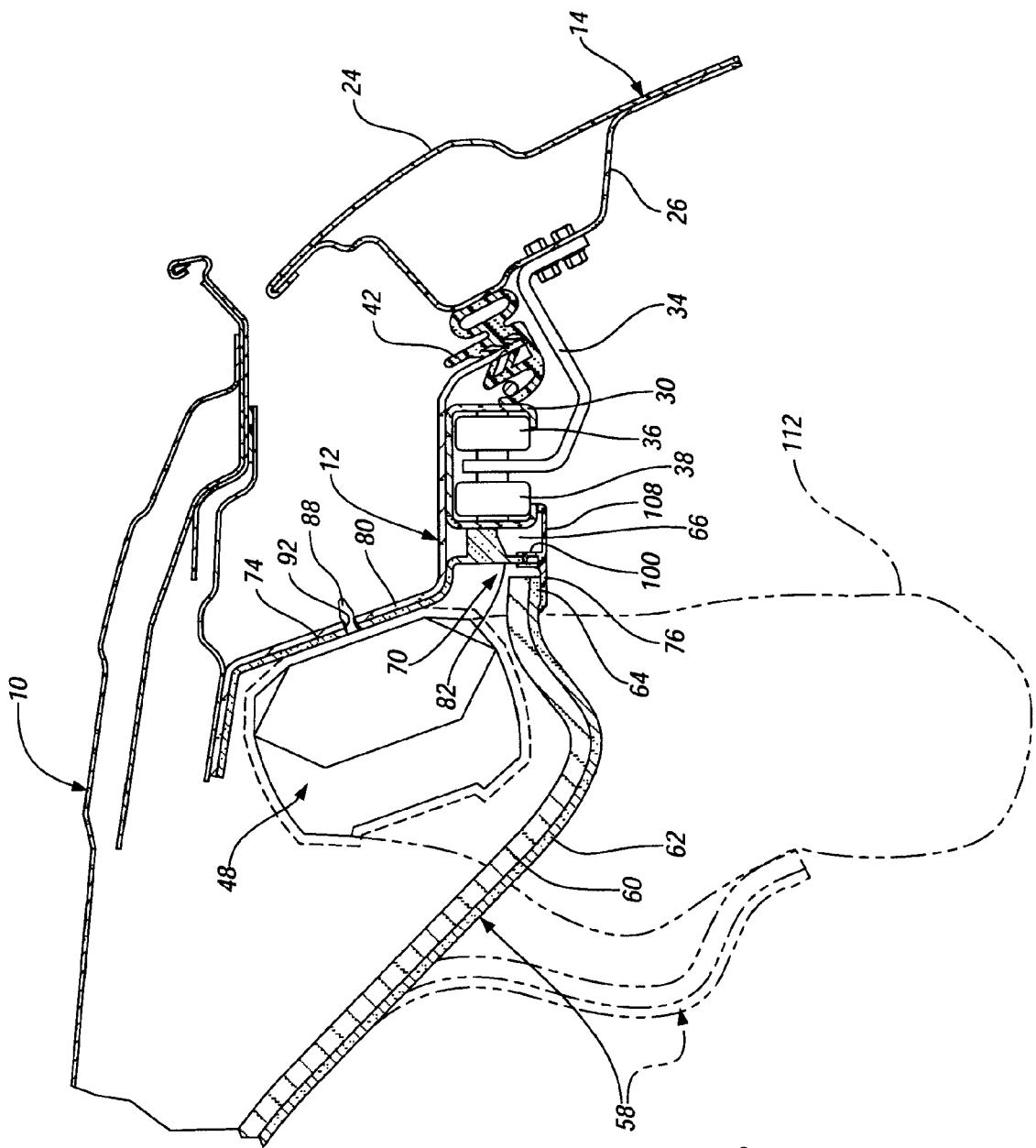
FIG. 3 is a section view taken in the direction of arrows 3-3 of FIG. 1 and also showing the roof rail, headliner, air bag and sliding door track; and, FIG. 4 is a section view similar to FIG. 3 but taken in the direction of arrows 4-4 of FIG. 2.

Referring to FIG. 3, a van-type motor vehicle is shown, and includes a roof 10, a roof rail 12, and a sliding door 14. The roof rail 12 is a sheet steel panel that extends longitudinally along the side of the vehicle body and cooperates with vehicle pillars, to form a door opening. The sliding door 14 is constructed of an outer door panel 24 and an inner door panel 26.

The sliding door 14 is mounted on the roof rail 12 by a track and roller arrangement. In particular, a longitudinal extending track 30 is attached to the roof rail 12. A bracket 34 is bolted to the door 14 and carries a pair of rollers 36 and 38 that are captured within the roof rail 12. FIG. 3 shows the door 14 in closed position in which the door 14 seals against a weatherstrip assembly 42 that is mounted on the edge of the roof rail 12.

FIG. 3 also shows an air bag module 48 that is mounted on the roof rail 12. Such air bag modules are well known and include housing, an inflator, and a folded-up air bag that will be inflated by the inflator. The air bag module 48 is concealed behind a headliner panel 58. The headliner panel 58 is conventionally constructed and attached to the vehicle roof, and includes a semi-rigid base layer 60 and a decorative layer 62. As seen in FIG. 3, the edge 64 of the headliner panel 58 stops short of engaging the track 30, leaving a gap 66 between the edge 64 of the headliner panel 58 and the track 30.

Figure 1:
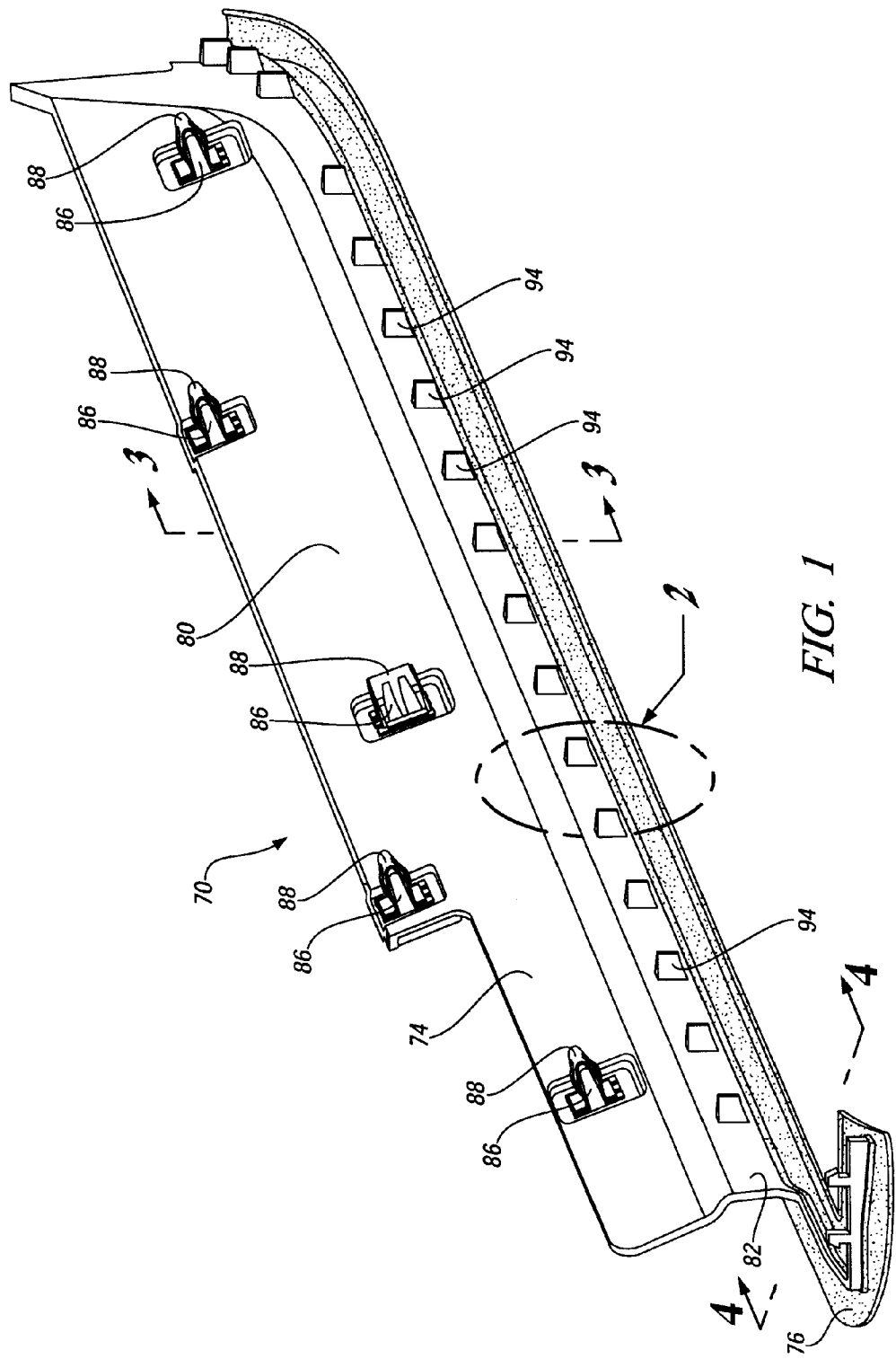
FIG. 1 is a perspective view of a carrier and a seal that are attached together to form a molding assembly.
Figure 2:
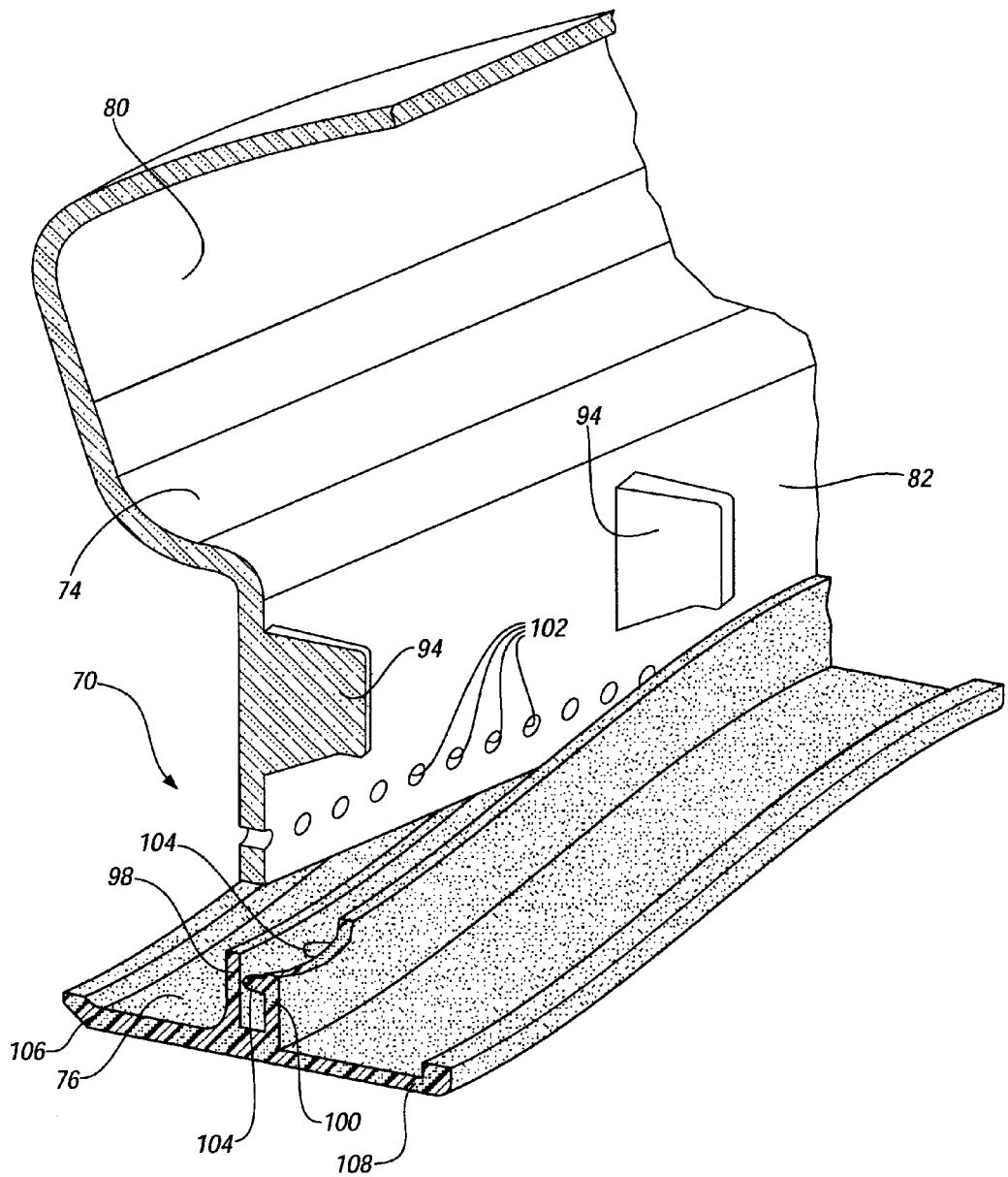
FIG. 2 is an enlarged fragmentary view of the region labeled "2" in FIG. 1.

A molding assembly, best seen in FIGS. 1 and 2, generally indicated at 70, is provided to trim the gap 66 between the edge 64 of the headliner panel 58 and the track 30. As seen in FIG. 1, the molding assembly 70 includes a carrier 74 of rigid molded plastic, such as TPO, and a seal strip 76 molded of a soft and flexible plastic material such as urethane. The molding assembly 70 is of substantial length so that it reaches all along the length of the track 30. The carrier 74 includes a base wall 80 that is adapted to abut with the roof rail 12, and a leg wall 82 that depends downwardly from the base wall 80 to reach into the gap 66. The base wall 80 has a plurality of integrally molded prongs 86, each of which carries a metallic retainer clip 88. The prongs 86 and clips 88 each align with a roof rail aperture, one of such apertures 92 being shown in FIG. 3, in order to attach the carrier 74 to the roof rail 12. The leg wall 82 of the carrier 74 has a plurality of abutments 94 that project into engagement with the track 30 to assist in positioning the carrier 74.

Figure 4:
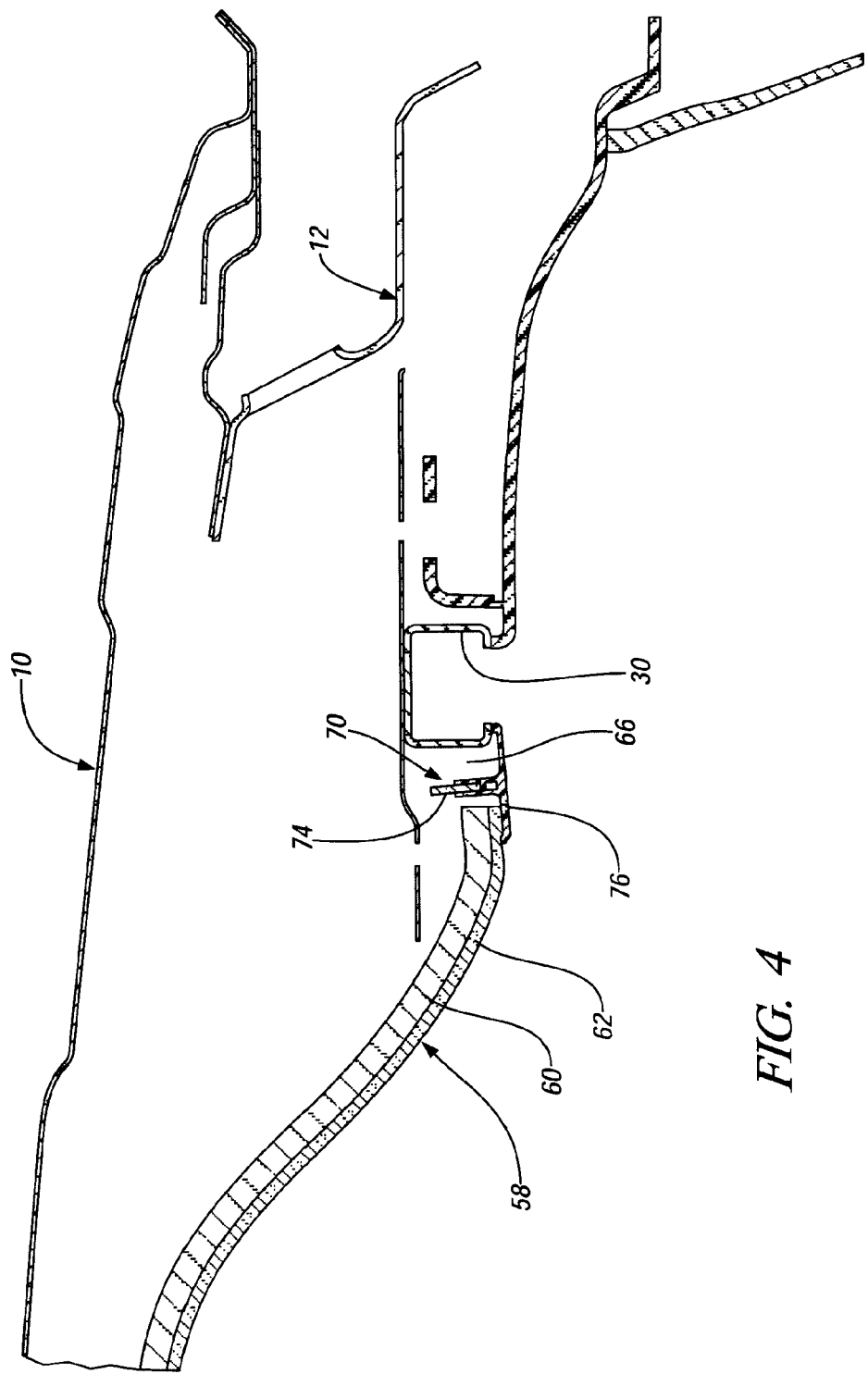

As best seen in FIG. 2, the seal strip 76 is generally shaped as an inverted T-shape and has a pair of stems 98 and 100 that fit onto the leg wall 82 of the carrier 74. The leg wall 82 has a plurality of holes 102 that receive projections 104 that are molded integral with the stem 100 and function to attach the seal strip 76 to the carrier 74. If desired, the carrier 74 can be placed in a mold and then the seal strip 76 is molded directly onto the carrier 74. Alternatively the seal strip 76 and the carrier 74 are separately molded and then assembled together by inserting the leg wall 82 of the carrier 74 between the stems 98 and 100 of the carrier 74. The seal strip 76 has an arm 106 that extends toward the headliner panel 58 and an arm 108 that extends toward the track 30. As seen in FIGS. 3 and 4, the arm 106 overlaps onto the edge of the headliner panel 58 and the arm 108 overlaps onto the edge of the track 30, so that the seal strip 76 effectively closes and conceals the gap 66 that exists between the edge 64 of the headliner panel 58 and the track 30.

As seen in FIG. 4, the forward most end of the track 30 reaches further inboard than the position of the track 30 shown in FIG. 3. Accordingly, as showing FIG. 1, the forward most end of the seal strip 76 is curved to the follow the bend in the track 30, so that the seal strip 76 effectively closes and conceals the gap 66 that exists between the edge of the headliner panel 58 and the track 30.

Referring to FIG. 3, it is seen that the air bag module 48 has been activated and the air bag 112 has inflated and pushed the headliner panel 58 downwardly as permitted by flexure of the headliner panel 58. The edge of the headliner panel 58 has pulled away and escaped from the arm 106 of the seal strip 76, as permitted by the flexure of the headliner panel 58 and flexure of the seal strip arm 106.

Thus it is seen that a molding assembly is provided for closing and sealing a gap between the headliner and sliding door track in a manner that permits the deployment of the roof rail mounted air bag assembly.

The description of the invention is merely exemplary in nature and, thus, variations thereof are intended to be within the scope of the invention.

What is claimed is:

1. In a vehicle body having a sliding door and a roof rail mounted air bag, the combination of;
    a sliding door track extending along a roof rail;
    an inflatable air bag mounted on the roof rail inboard of the track;
    a headliner panel concealing the inflatable air bag and having an edge that extends along the track but is spaced therefrom to create a gap; and
    a molding assembly for closing the gap and including a carrier attached to the roof rail and a flexible seal strip that is attached to the carrier to close the gap, said flexible sealing strip having a first arm and a second arm, said first arm lapping onto the edge of the headliner panel and permitting the headliner panel to fold away from the seal strip upon deployment of the air bag, and said second arm lapping onto the track.

2. The combination of claim 1 further comprising the carrier having a plurality of attachment clips mounted thereon for insertion into mating apertures provided in the roof rail to mount the molding assembly on the roof rail.

3. The combination of claim 1 in which the flexible sealing strip is of an inverted T-shape and includes a stem portion mounted on the carrier and first and second arms extending laterally from the stem portion with the first arm lapping onto the edge of the headliner panel and the second arm lapping onto the edge of the track.

4. The combination of claim 3 in which the stem portion includes a first stem and a second stem that are spaced from one another to capture the carrier there between and thereby mount the flexible sealing strip on the carrier.

5. The combination of claim 1 in which the carrier includes a base wall that engages against the roof rail and is attached thereto and a leg wall that extends downwardly into the gap between the edge of the headliner and the track, and the flexible sealing strip is mounted on the leg wall of the carrier.

6. The combination of claim 5 in which the carrier includes a plurality of attachment clips mounted thereon for insertion into mating apertures provided in the roof rail to attach the carrier on the roof rail.

7. The combination of claim 1 in which the carrier includes a plurality of abutments engaging with the track to assist in locating the molding assembly relative the track.

8. In a vehicle body having a sliding door and a roof rail mounted air bag, the combination of;
    a roof rail extending longitudinally;
    a sliding door track extending along the roof rail;
    an inflatable air bag mounted on the roof rail inboard of the track;
    a headliner panel concealing the inflatable air bag and having an edge that extends along the track but is spaced therefrom to create a gap; and
    a molding assembly for closing the gap, said molding assembly including a carrier attached to the roof rail and having a leg wall extending downwardly into the gap, and a flexible seal strip that is attached to the leg wall of the carrier and having a first arm lapping onto the edge of the headliner panel and a second arm lapping onto the track, said headliner panel being sufficiently flexible to bend downwardly upon deployment of the air bag and said first arm of the seal strip being sufficiently flexible to bend downwardly and allow escape of the headliner panel as the air bag deploys.

9. The combination of claim 8 in which the carrier also has a base wall that extends between the inflatable air bag and the roof rail and carries a plurality of fasteners by which the carrier is attached to the roof rail.

10. The combination of claim 9 in which the plurality of fasteners are fastener clips that extend into complementary apertures provided in the roof rail.

11. The combination of claim 8 in which the flexible sealing strip is of an inverted T-shape and includes a stem portion mounted on the carrier and having the first and second arms extending laterally from the stem portion.

12. The combination of claim 11 in which the stem portion includes a first stem and a second stem that are spaced from one another to capture the carrier there between and thereby mount the flexible sealing strip on the carrier.

13. In a vehicle body having a sliding door and a roof rail mounted air bag, the combination of:
    a roof rail extending longitudinally and having a plurality of apertures therein;
    a sliding door track extending along the roof rail;
    an inflatable air bag mounted on the roof rail inboard of the track;
    a headliner panel concealing the inflatable air bag and having an edge that extends along the track but is spaced therefrom to create a gap; and
    a molding assembly for closing the gap, said molding assembly including a carrier attached to the roof rail and having a leg wall extending downwardly into the gap and a base wall, a plurality of fasteners carried by the base wall of the carrier and extending into the apertures of the roof rail to attach the molding assembly to the roof rail, and a flexible seal strip that is attached to the leg wall of the carrier and having a first arm lapping onto the edge of the headliner panel and a second arm lapping onto the track to close the gap, said first arm of the seal strip bending downwardly to allow the edge of the headliner to escape the molding assembly upon deployment of the air bag.

14. The combination of claim 13 in which the flexible sealing strip is of an inverted T-shape and includes a stem portion mounted on the carrier and first and second arms extending laterally from the stem portion.

15. The combination of claim 13 in which the stem portion includes a first stem and a second stem that are spaced from one another to capture the carrier there between and thereby mount the flexible sealing strip on the carrier.

\* \* \* \* \*